US 11,712,648 B2

(12) United States Patent
Katayama et al.

(10) Patent No.: US 11,712,648 B2
(45) Date of Patent: Aug. 1, 2023

(54) WATER-TREATING CERAMIC FILTER MODULE

(71) Applicant: PROTERIAL, LTD., Tokyo (JP)

(72) Inventors: Yoshio Katayama, Tokyo (JP); Keiko Nakano, Tokyo (JP); Toshitaka Ishizawa, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 460 days.

(21) Appl. No.: 16/962,656

(22) PCT Filed: Feb. 4, 2019

(86) PCT No.: PCT/JP2019/003923
§ 371 (c)(1),
(2) Date: Jul. 16, 2020

(87) PCT Pub. No.: WO2019/151522
PCT Pub. Date: Aug. 8, 2019

(65) Prior Publication Data
US 2020/0346149 A1    Nov. 5, 2020

(30) Foreign Application Priority Data

Feb. 2, 2018    (JP) .................................. 2018-017302

(51) Int. Cl.
*B01D 39/20*    (2006.01)
*B01D 29/33*    (2006.01)
(Continued)

(52) U.S. Cl.
CPC ....... *B01D 39/2068* (2013.01); *B01D 29/336* (2013.01); *B01D 35/30* (2013.01);
(Continued)

(58) Field of Classification Search
CPC .. B01D 39/2068; B01D 29/336; B01D 35/30; B01D 61/025; B01D 61/04;
(Continued)

(56) References Cited

U.S. PATENT DOCUMENTS 4,830,749 A    5/1989   Okamoto et al.
5,194,154 A    3/1993   Moyer et al.
(Continued)

FOREIGN PATENT DOCUMENTS

JP        63-20012 A      1/1988
JP        63-201623 U    12/1988
(Continued)

OTHER PUBLICATIONS

English Machine Translation of JP2015054802A (Year: 2015).*
(Continued)

*Primary Examiner* — Madeline Gonzalez
(74) *Attorney, Agent, or Firm* — Sughrue Mion, PLLC (57) ABSTRACT

A water-treating ceramic filter module comprising a filter unit, and a housing containing the filter unit; the filter unit comprising pluralities of cylindrical honeycomb structures each having pluralities of flow paths partitioned by porous ceramic cell walls and extending in one direction, and sheet-shaped connecting members connecting the honeycomb structures in series in the flow path direction; each connecting member having pluralities of penetrating holes for achieving the communication of the corresponding flow paths of adjacent honeycomb structures, to constitute pluralities of communicating flow paths; the communicating flow paths being composed of first communicating flow paths plugged only at one-side end, and second communicating flow paths plugged only at the other-side end; and the housing has an inlet on the side of the one-side end for receiving the water to be treated from outside, and an outlet
(Continued)

on the side of the other-side end for discharging the treated water.

14 Claims, 9 Drawing Sheets

(51) Int. Cl.
```
B01D 35/30      (2006.01)
C02F 1/28       (2023.01)
B01J 20/02      (2006.01)
B01J 20/28      (2006.01)
B01D 61/02      (2006.01)
B01D 61/04      (2006.01)
C02F 1/44       (2023.01)
C02F 101/30     (2006.01)
```

(52) U.S. Cl.
CPC ......... *B01J 20/02* (2013.01); *B01J 20/28045* (2013.01); *C02F 1/281* (2013.01); *B01D 61/025* (2013.01); *B01D 61/04* (2013.01); *B01D 2201/4038* (2013.01); *B01D 2201/62* (2013.01); *B01D 2311/2626* (2013.01); *C02F 1/441* (2013.01); *C02F 2101/30* (2013.01)

(58) Field of Classification Search
CPC ........ B01D 2201/4038; B01D 2201/62; B01D 2311/2626; B01D 2313/025; B01D 2313/06; B01D 2313/08; B01D 2315/08; B01D 2319/022; B01D 63/066; B01J 20/02; B01J 20/28045; C02F 1/281; C02F 1/441; C02F 2101/30
USPC .... 210/510.1, 323.2, 457, 477, 496, 497.01, 210/455, 456, 435; 55/502, 523
See application file for complete search history.

(56) References Cited

U.S. PATENT DOCUMENTS

| | | |
|---|---|---|
| 2004/0161373 A1 | 8/2004 | Ichikawa et al. |
| 2009/0202402 A1 | 8/2009 | Sato |
| 2012/0168995 A1 | 7/2012 | Sato |
| 2020/0048110 A1 | 2/2020 | Nakano et al. |

FOREIGN PATENT DOCUMENTS

| | | | | |
|---|---|---|---|---|
| JP | 2001-205108 A | | 7/2001 | |
| JP | 2003-117335 A | | 4/2003 | |
| JP | 2004-075522 A | | 3/2004 | |
| JP | 2004-251137 A | | 9/2004 | |
| JP | 2006-150276 A | | 6/2006 | |
| JP | 2012-091151 A | | 5/2012 | |
| JP | 2013-223827 A | | 10/2013 | |
| JP | 2015-54802 A | | 3/2015 | |
| JP | 2015054802 A | * | 3/2015 | |
| JP | 2016-198742 A | | 12/2016 | |
| JP | 6216847 B2 | | 10/2017 | |
| JP | 2018-183745 A | | 11/2018 | |
| WO | 93/11087 A1 | | 6/1993 | |
| WO | WO-9311087 A1 | * | 6/1993 | ............. B01D 29/31 |

OTHER PUBLICATIONS

International Search Report for PCT/JP2019/003923 dated Apr. 23, 2019 [PCT/ISA/210].
Communication dated Feb. 15, 2021, from the European Patent Office in EP Application No. 19748175.7.
Notice of Reasons for Refusal dated Sep. 13, 2022 from the Japan Patent Office in Japanese Application No. 2019-569635.

* cited by examiner

WATER-TREATING CERAMIC FILTER MODULE

CROSS REFERENCE TO RELATED APPLICATIONS

This application is a National Stage of International Application No. PCT/JP2019/003923 filed Feb. 4, 2019, claiming priority based on Japanese Patent Application No. 2018-017302 filed Feb. 2, 2018.

FIELD OF THE INVENTION

The present invention relates to a water-treating ceramic filter module for removing contaminant by adsorption.

BACKGROUND OF THE INVENTION

In the advanced water purification, water treatment systems using reverse osmosis membranes are put into practical use. A reverse osmosis membrane is a type of separation membranes, needing the removal of the accumulated contaminant by periodically flowing a cleaning liquid therethrough. Usually, because the reverse osmosis membrane is gradually deteriorated by the cleaning liquid, a reverse osmosis membrane module is periodically replaced. The periodic replacement of the reverse osmosis membrane module stops a water treatment operation for a long period of time, resulting in a low operation rate. Also, because the reverse osmosis membrane module cannot be regenerated, it should be replaced by a new reverse osmosis membrane module, increasing the cost of expendables for reverse osmosis membranes, the treatment cost of wastes, etc., thereby resulting in increased running cost per a unit amount of water treated.

Proposed to increase the replacement life of a separation membrane is the arrangement of an adsorption member upstream of the reverse osmosis membrane to conduct pretreatment, by which contaminants such as organic materials, etc. deteriorating the performance of the separation membrane are removed by adsorption in advance from water to be treated.

For example, Reference 1 (JP 2012-91151 A) discloses a structure for adsorbing organic materials in water to be treated, comprising an outer wall, pluralities of flow paths inside the outer wall, and cell walls partitioning the flow paths, the cell walls having pores communicating adjacent flow paths. With the inlet and outlet ends of each flow path alternately closed by ceramic plugs, the water to be treated flowing from the flow paths open at the inlet end to the absorbing structure passes through communicating pores of the cell walls to enter adjacent flow paths (flow paths open at the exit end), and exits from the exit end. It is also disclosed that while the water to be treated passes through the communicating pores formed in the cell walls, organic materials are removed from the water by adsorption by an absorbing polymer material formed on the cell walls. Such an absorbing structure is more advantageous than using absorbing material particles per se, in the easiness of maintenance operation such as replacement, etc., enabling cost reduction.

To increase water treatment capacity, and to expand the replacement period, the absorbing structure described in Reference 1 should be made bigger, or pluralities of absorbing structures should be used. However, a bigger absorbing structure needs a new production facility, and the use of pluralities of absorbing structures increases the number of housings, disadvantageous in cost.

Reference 2 (JP 6216847 B) discloses a reverse osmosis treatment apparatus comprising a first pressure vessel for primarily treating water, and a second pressure vessel for secondarily treating the primarily treated water, pluralities of reverse osmosis membrane elements being arranged in series in the first and second pressure vessels, and the number of reverse osmosis membrane elements in the first pressure vessel being smaller than the number of reverse osmosis membrane elements in the second pressure vessel. Usually, when reverse osmosis membrane elements are arranged in series, reverse osmosis membranes on the supply side of the water to be treated are easily contaminated, resulting in a higher frequency of their replacement. In the reverse osmosis treatment apparatus of Reference 2 comprising the first and second pressure vessels, only reverse osmosis membrane elements in the easily contaminable first pressure vessel can be replaced, resulting in increased operation efficiency. It is further described that because the first pressure vessel contains a small number of reverse osmosis membrane elements, their replacement is easy.

However, when the structure described in Reference 2 is used in the adsorption structure of Reference 1 arranged upstream of the reverse osmosis membranes, to provide a system in which filters constituted by pluralities of adsorption structures are contained in a housing, most clogging materials (corresponding to contaminants in Reference 2) are captured in the most upstream filter, resulting in higher load in the most upstream filter, and thus making the use period of the filter short (increased replacement frequency).

Particularly, a large amount of water treated by large water treatment systems sometimes needs several hundreds to thousands of adsorption structures. Thus, the development of a water treatment system having a pretreatment step having high efficiency by reduced replacement frequency of adsorption structures is desired.

REFERENCES

Reference 1: JP 2012-91151 A, and
Reference 2: JP 6216847 B.

OBJECT OF THE INVENTION

Accordingly, an object of the present invention is to provide a water-treating ceramic filter module having a filter unit comprising pluralities of adsorption structures without increasing their sizes to have improved efficiency with the reduced replacement frequency of adsorption structures.

SUMMARY OF THE INVENTION

As a result of intensive research in view of the above object, the inventors have found that by connecting pluralities of ceramic honeycomb structures as adsorption structures in series via connecting members, with corresponding flow paths of the ceramic honeycomb structures communicating with each other, to constitute a filter unit having pluralities of communicating flow paths, and by constituting the communicating flow paths of the filter unit by those closed only at ends to which water to be treated is supplied and those closed only at ends from which the treated water is discharged, a water-treating ceramic filter module comprising the ceramic honeycomb structures acting as an integral ceramic honeycomb filter can be obtained. The present invention has been completed based on such finding.

Thus, the water-treating ceramic filter module of the present invention comprises a filter unit, and a housing containing the filter unit;

the filter unit comprising pluralities of cylindrical honeycomb structures each having pluralities of flow paths partitioned by porous ceramic cell walls and extending in one direction, and sheet-shaped connecting members connecting the honeycomb structures in series in the flow path direction;

each of the connecting members having pluralities of penetrating holes for achieving the communication of the corresponding flow paths of adjacent honeycomb structures, to constitute pluralities of communicating flow paths;

the communicating flow paths being composed of first communicating flow paths plugged only at one-side end, and second communicating flow paths plugged only at the other-side end; and the housing having an inlet on the side of the one-side end for receiving water to be treated from outside, and an outlet on the side of the other-side end for discharging the treated water.

In the water-treating ceramic filter module of the present invention, the first communicating flow paths and the second communicating flow paths are preferably adjacent to each other.

In the water-treating ceramic filter module of the present invention, the connecting member preferably has projections on both surfaces, which are fit into particular flow paths open on the end surfaces of the adjacent honeycomb structures to connect the adjacent honeycomb structures.

In the water-treating ceramic filter module of the present invention, the projections of the connecting members are preferably tapered.

In the water-treating ceramic filter module of the present invention, the connecting member preferably has a belt-like region having the projections but free of the penetrating holes on both surfaces.

In the water-treating ceramic filter module of the present invention, the distance between adjacent penetrating holes of the connecting member is preferably equal to or less than the thickness of the cell walls of the honeycomb structure.

In the water-treating ceramic filter module of the present invention, each connecting member preferably has the same shape as that of the honeycomb structure when viewed in the longitudinal direction.

In the water-treating ceramic filter module of the present invention, the connecting members are preferably made of an elastic material.

In the water-treating ceramic filter module of the present invention, the elastic material forming the connecting members is preferably at least one selected from the group consisting of silicone rubber, fluororubber, ethylene-propylene-diene rubber, and nitrile-butadiene rubber.

In the water-treating ceramic filter module of the present invention, the filter unit preferably comprises a first plugging member having pluralities of plugs closing only the first communicating flow paths at the one-side end, and a second plugging member having pluralities of plugs closing only the second communicating flow paths at the other-side end.

In the water-treating ceramic filter module of the present invention, it is preferable that the first plugging member has holes for permitting the water to be treated to flow at positions corresponding to the second communicating flow paths, and the second plugging member has holes for permitting the treated water to flow at positions corresponding to the first communicating flow paths.

In the water-treating ceramic filter module of the present invention, the first and second plugging members are preferably sheets having the same shape as that of the honeycomb structure when viewed in the longitudinal direction.

In the water-treating ceramic filter module of the present invention, each of the holes of the first and second plugging members preferably has an area equal to or larger than the opening area of each corresponding flow path of the honeycomb structure.

In the water-treating ceramic filter module of the present invention, the first and second plugging members are preferably made of elastic materials.

In the water-treating ceramic filter module of the present invention, the elastic material forming the first and second plugging members is preferably at least one selected from the group consisting of silicone rubber, fluororubber, ethylene-propylene-diene rubber, and nitrile-butadiene rubber.

In the water-treating ceramic filter module of the present invention, the housing is preferably made of a material resistant to aqueous alkaline solutions.

EFFECTS OF THE INVENTION

Because the water-treating ceramic filter module of the present invention has a structure in which pluralities of honeycomb structures are connected in series with their corresponding flow paths communicating, the adsorbing performance of pluralities of honeycomb structures can be uniformly utilized from the supply side of water to be treated to the discharge side, resulting in increased efficiency of the filter. Accordingly, organic materials, etc. contained in water to be treated are not predominantly adsorbed in a honeycomb structure on the inlet side, avoiding premature decrease in adsorption performance, and thus increasing the usable period of the filter. Also, it has a smaller number of housings and pipes than in a structure in which honeycomb structures are arranged with distances, achieving production cost reduction.

DESCRIPTION OF THE PREFERRED EMBODIMENTS

[1] Water Treatment Facility

Figure 13:
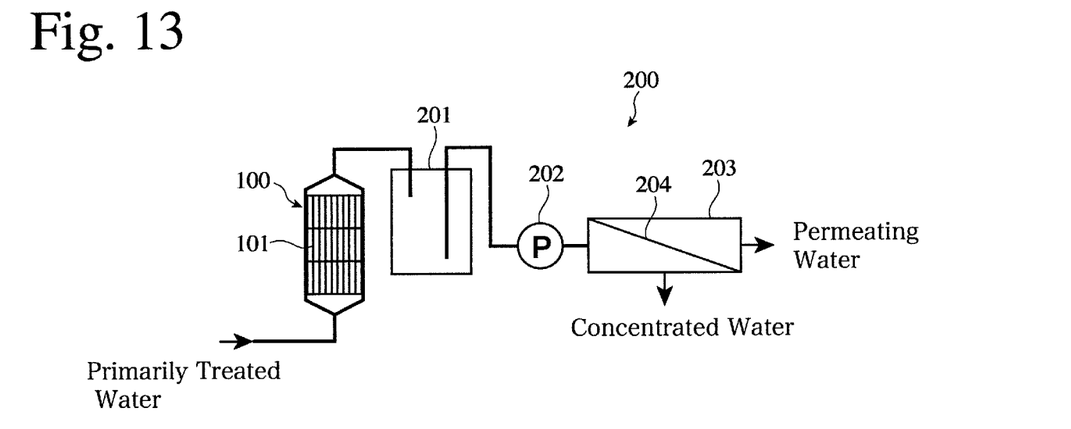
FIG. 13 is a flow diagram schematically showing a water treatment facility comprising the water-treating ceramic filter module of the present invention.

A water treatment facility to which the water-treating ceramic filter module of the present invention is applicable is first explained referring to FIG. 13.

The water-treating ceramic filter module 100 of the present invention is used, for example, in a water treatment facility 200 shown in the flow diagram of FIG. 13. The water treatment facility 200 comprises the water-treating ceramic filter module 100 of the present invention, a water tank 201 storing water treated in the water-treating ceramic filter module 100, a water-supplying pump 202 for supplying water from the water tank 201, and a reverse osmosis membrane module 203 comprising reverse osmosis membranes 204 for removing separable materials from water supplied by the water-supplying pump 202. The water-treating ceramic filter module 100 of the present invention conducts an upstream pretreatment step of selectively and efficiently adsorbing and removing organic materials, etc., which would contaminate the reverse osmosis membranes 204 in the downstream reverse osmosis membrane module 203.

Water primarily treated by the removal of garbage, etc. by screens, the removal of fine suspended materials such as sand by sedimentation with a coagulant, the decomposition of organic materials with microbes, etc., still contains dissolved materials such as salt, dissolved organic materials, etc., which are hereinafter called dissolved organic materials, etc. as a whole. The primarily treated water supplied to the water-treating ceramic filter module 100 of the present invention passes through the filter unit 101 comprising porous ceramic honeycomb structures inside the filter module 100 to remove these dissolved organic materials, etc. by adsorption, and then is stored in the water tank 201 temporarily. Under pressure by the water-supplying pump 202, the primarily treated water stored in the water tank 201 in a predetermined amount is supplied to and passes through the reverse osmosis membranes 204, by which it is divided to permeating water with dissolved organic materials, etc. removed, and concentrated water in which the dissolved organic materials, etc. are concentrated. Thus, the water-treating ceramic filter module 100 of the present invention preliminarily removes the dissolved organic materials, etc. from the primarily treated water by adsorption to avoid the contamination of the reverse osmosis membranes 204, thereby expanding the replacement life of the reverse osmosis membranes 204.

The water-treating ceramic filter module 100 of the present invention can be widely used in water treatment facilities comprising reverse osmosis membranes for the desalination of seawater, the production of pure water used in the production of precise electronic devices such as semiconductors, etc., the advanced treatment of tap water, the regeneration of drainage water and sewage water (including those not using microbes), etc.

[2] Water-Treating Ceramic Filter Module

Figure 1:
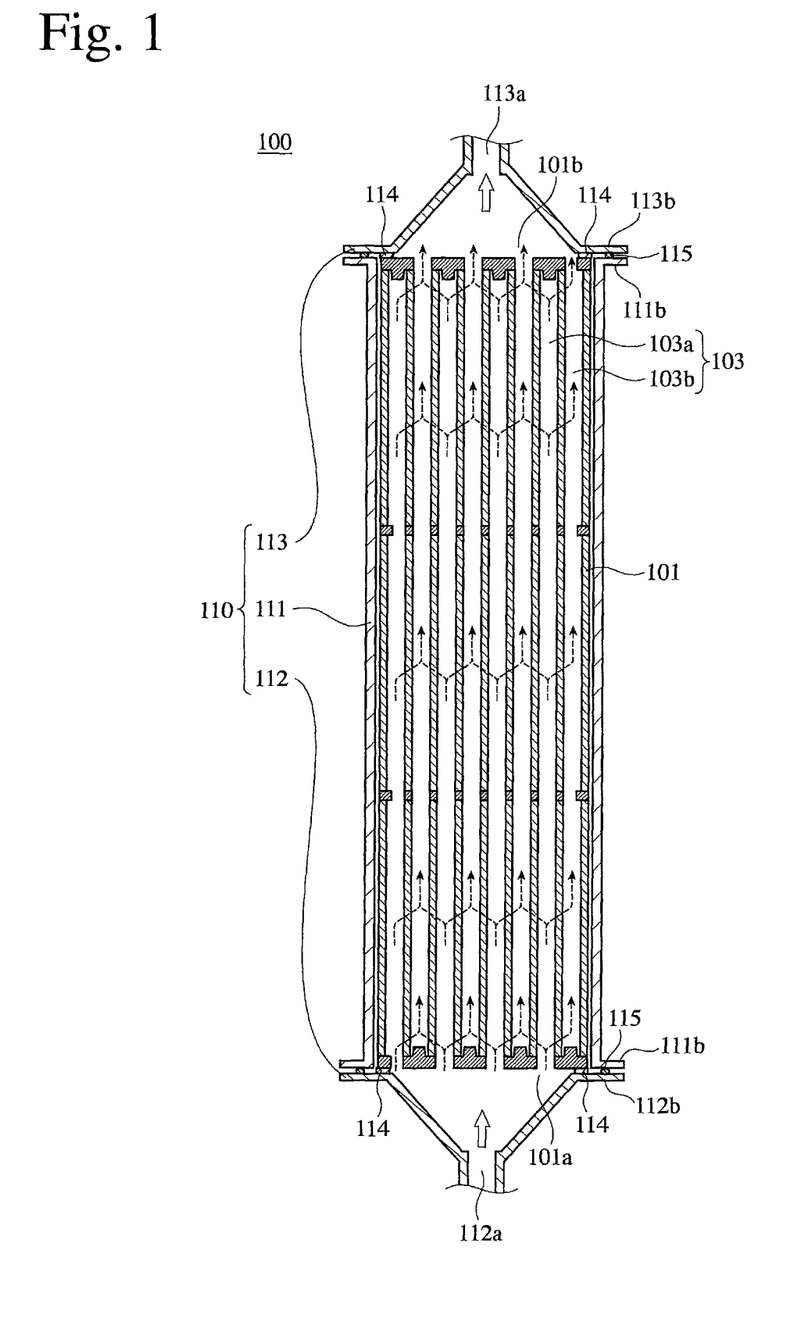
FIG. 1 is a schematic cross-sectional view showing an example of the water-treating ceramic filter modules of the present invention.
Figure 2:
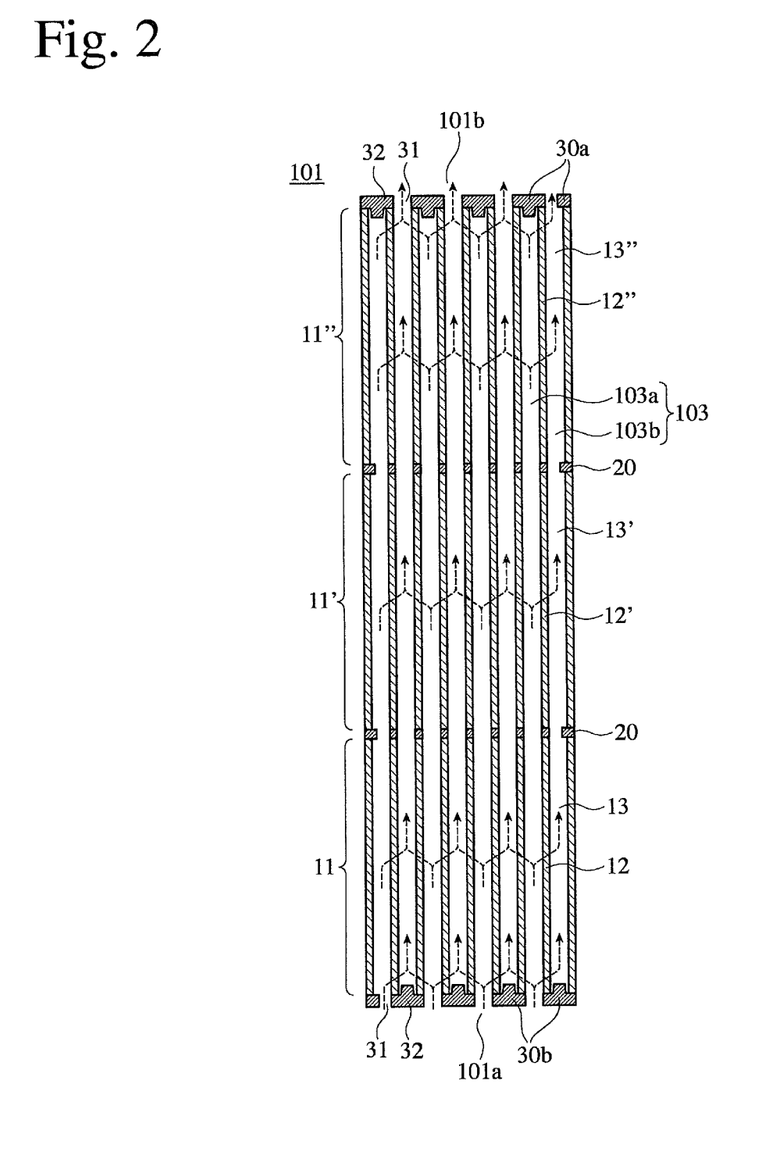
FIG. 2 is a schematic cross-sectional view showing a filter unit in the water-treating ceramic filter module of the present invention shown in FIG. 1.

Next, the structure of the water-treating ceramic filter module of the present invention will be explained. As shown in FIGS. 1 and 2, the water-treating ceramic filter module 100 of the present invention comprises a filter unit 101, and a housing 110 containing the filter unit 101; the filter unit 101 being composed of pluralities of cylindrical honeycomb structures 11, 11', 11" having pluralities of flow paths 13, 13', 13" partitioned by porous ceramic cell walls 12, 12', 12" and extending in one direction (hereinafter referred to as "porous honeycomb structures" or "honeycomb structures"), and sheet-shaped connecting members 20 connecting pluralities of honeycomb structures 11, 11', 11" in series in the flow path direction; each connecting member 20 having pluralities of penetrating holes for the communication of corresponding flow paths 13, 13', 13" in adjacent honeycomb structures 11, 11', 11" to constitute pluralities of communicating flow paths 103; the communicating flow paths 103 being composed of first communicating flow paths 103b with one-side ends 101a plugged, and second communicating flow paths 103a with their other-side ends 101b plugged; and the housing 110 comprising an inlet 112a, into which water to be treated flows, at the one-side end 101a, and an outlet 113a, from which the treated water exits, at the other-side end 101b.

Next, elements constituting the water-treating ceramic filter module of the present invention will be explained below.

(1) Filter Unit

As shown in FIG. 2, the water-treating ceramic filter module 100 of the present invention uses the filter unit 101 constituted by pluralities of honeycomb structures 11, 11', 11" arranged in series in the flow path direction. Though the filter unit 101 in FIG. 2 has three honeycomb structures 11, 11', 11", the present invention is not restricted thereto. The filter unit may be constituted by two honeycomb structures, or four honeycomb structures or more. The honeycomb structures constituting the filter unit may have the same or different lengths in the flow path direction.

The filter unit 101 comprises, in addition to the honeycomb structures 11, 11', 11", connecting members 20 connecting adjacent honeycomb structures 11 and 11', and 11' and 11", such that their corresponding flow paths are communicating with each other. As a result, the flow paths 13, 13', 13" constitute communicating flow paths 103 via the connecting members 20.

The filter unit 101 shown in FIG. 2 further comprises a first plugging member 30b closing the one-side ends 101a of the first communicating flow paths 103b from which the treated water exits, and a second plugging member 30a closing the other-side ends 101b of the second communicating flow paths 103a into which the water to be treated is introduced. However, if similarly plugged honeycomb structures were used, these plugging members 30 (first and second plugging members 30b, 30a) may not be used.

To protect the filter unit 101, and to secure water to flow in the filter unit 101 without leak, a peripheral (side) surface of the filter unit 101 may be surrounded by a water-impermeable member (not shown).

With such a structure comprising pluralities of honeycomb structures as adsorption structures arranged in series, the filter unit can have increased adsorption capacity without making each honeycomb structure bigger, thereby providing a water-treating ceramic filter module having improved efficiency by reducing the frequency of replacing adsorption structures.

(a) Connecting Member

Figure 4A:
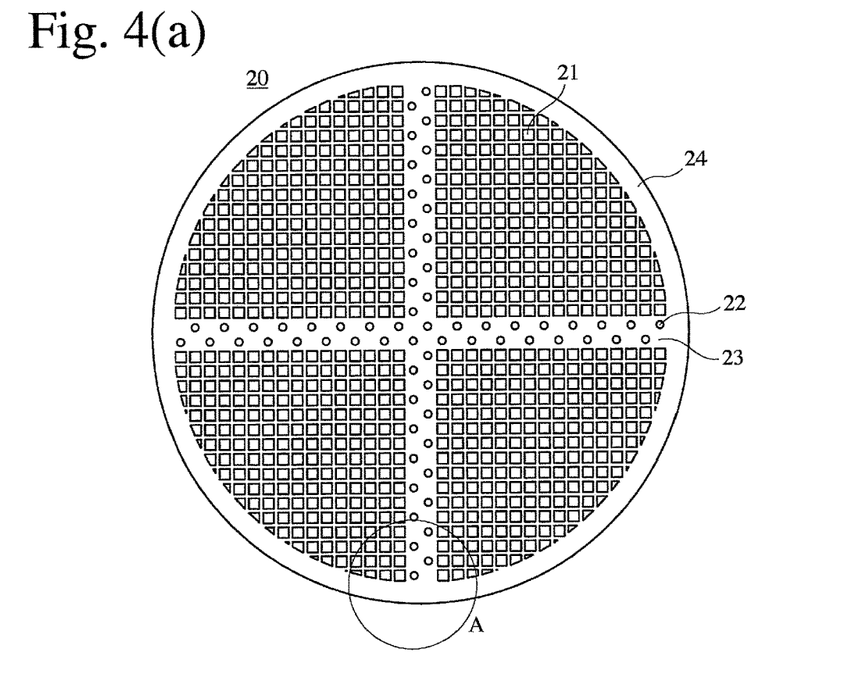
FIG. 4(a) is a front view schematically showing an example of connecting members used in the water-treating ceramic filter module of the present invention.
Figure 4B:
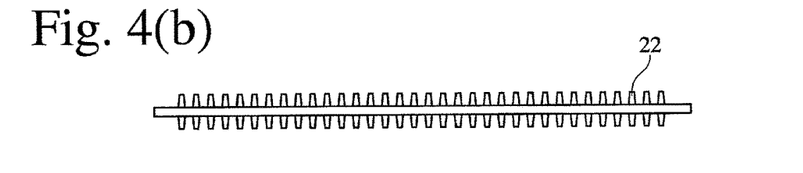
FIG. 4(b) is a plan view schematically showing the connecting member of FIG. 4(a).

The filter unit 101 comprises the connecting members 20 connecting adjacent honeycomb structures (honeycomb structures 11 and 11', and honeycomb structures 11' and 11" in FIG. 2), such that their corresponding flow paths are communicating with each other. With the adjacent honeycomb structures connected by the connecting members 20, the corresponding flow paths of the honeycomb structures 11, 11', 11" constitute communicating flow paths 103 extending from the one-side end 101a to the other-side end 101b. FIGS. 4(a) and 4(b) show an example of the connecting members 20, FIGS. 5(a) and 5(b) enlargedly show a portion A of the connecting member 20 of FIG. 4(a), and FIGS. 6(a) and 6(b) enlargedly show a center portion of the connecting member 20 of FIG. 4(a). Each connecting member 20 is a sheet-shaped member having the same shape as that of the honeycomb structure 11 when viewed in the direction of the flow paths 13 (the longitudinal direction), which comprises penetrating holes 21 arranged at positions corresponding to predetermined flow paths 13 of the honeycomb structure 11, and projections 22 arranged on both sides to be fit into particular flow paths 13.

When the connecting member 20 is attached to the honeycomb structure 11, the projections 22 are fit into the corresponding flow paths 13, to facilitate the positioning of the penetrating holes 21 of the connecting member 20 to the flow paths 13 of the honeycomb structure 11. As shown in FIG. 5(b) [C-C cross section of FIG. 5(a)], the projections 22 are preferably tapered for easy fitting into the flow paths 13.

In the connecting member 20, the projections 22 are preferably arranged on both sides of the belt-like region 23 free from penetrating holes 21, further preferably in a staggering pattern, thereby making easier the positioning of the penetrating holes 21 of the connecting member 20 to the flow paths 13 of the honeycomb structure 11. Because there are no penetrating holes 21 in the belt-like region 23, the flow paths are shut in this region, providing no communicating flow paths 103. Because water does not flow in the flow paths not constituting the communicating flow paths 103, the cell walls forming such flow paths do not contribute to the removal of the dissolved organic materials, etc. by adsorption. To have as many communicating flow paths 103 contributing to the purification of water as possible, the belt-like region 23 is preferably as narrow as possible in such a range as to secure enough positioning precision.

Figure 5A:
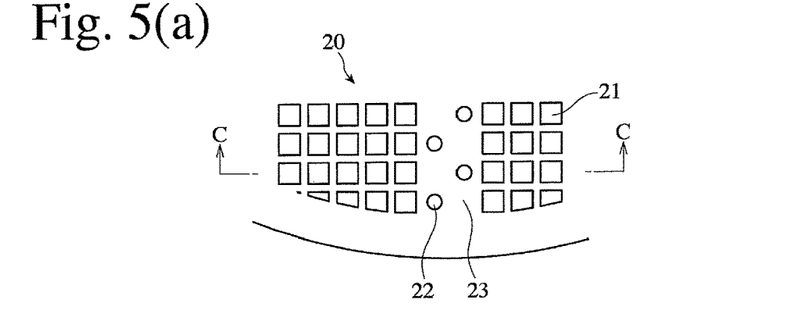
FIG. 5(a) is an enlarged front view schematically showing a portion A in FIG. 4(a).
Figure 5B:
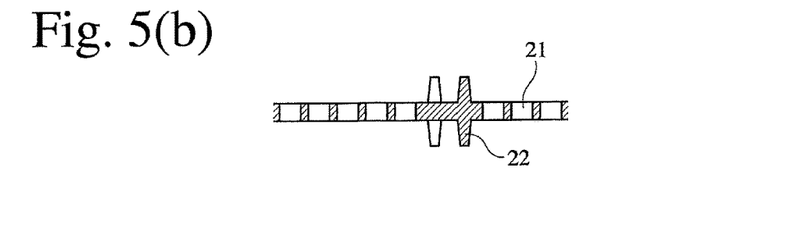
FIG. 5(b) is a cross-sectional view taken along the line C-C in FIG. 5(a).
Figures 6A, 6B:
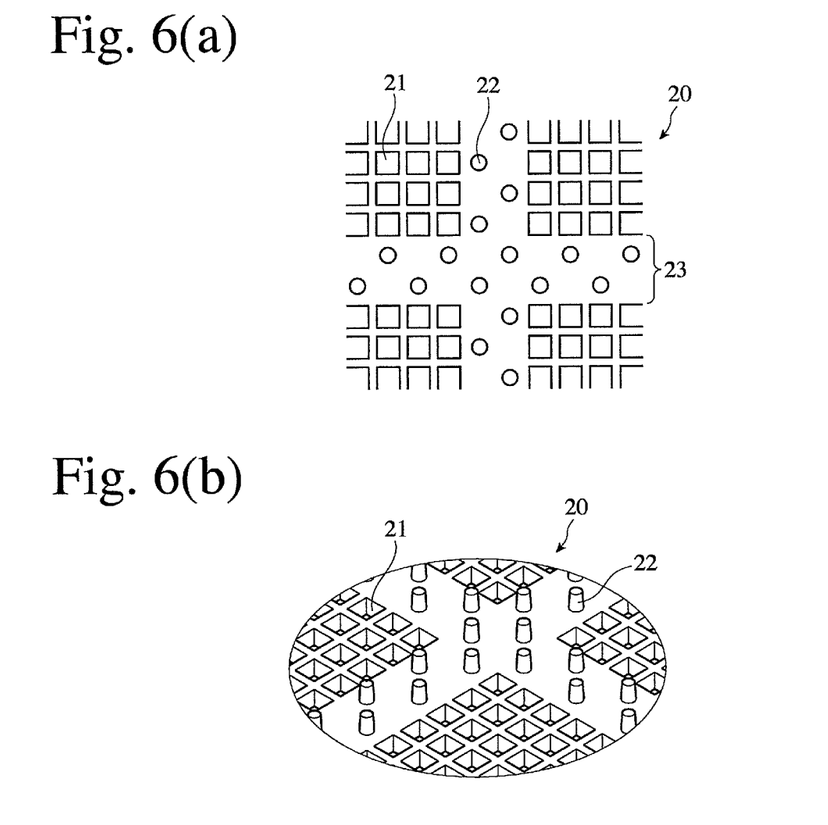
FIG. 6(a) is an enlarged front view schematically showing a center portion of FIG. 4(a).
FIG. 6(b) is a perspective view of FIG. 6(a).

In the preferred connecting member 20 illustrated in FIGS. 4-6, the projections 22 are arranged in a staggering pattern in a cross-shaped belt-like region 23 passing a center of the connecting member 20. The cross-shaped belt-like region 23 passing a center of the connecting member 20 provides good balance between the assured positioning of the penetrating holes 21 of the connecting member 20 to the flow paths 13 of the honeycomb structure 11, and the distribution of the communicating flow paths 103 when viewed in the longitudinal direction of the filter unit 101, though the shape of the belt-like region 23 is not restricted to a cross but may have any shape.

In FIGS. 4-6, the projections 22 are arranged in a staggering pattern. Namely, the projections 22 are arranged in two lines in the longitudinal direction of the belt-like region 23, with intervals of the projections 22 in each line as wide as two times those of the penetrating holes 21, such that the projections 22 in each line are arranged alternately in the width direction (transverse direction) of the belt-like region 23. Such arrangement of the projections 22 makes positioning easy in the fitting of the projections 22 into the flow paths 13.

Figure 7:
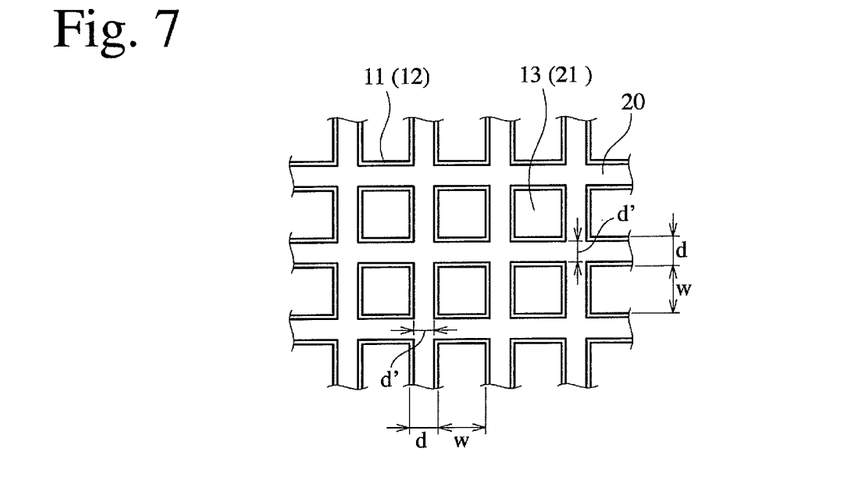
FIG. 7 is a front view showing a connecting member attached to the honeycomb structure from the connecting member side.

FIG. 7 is a front view showing the connecting member 20 attached to the honeycomb structure 11 from the side of the connecting member 20. The honeycomb structure 11 shown in FIG. 7 has lattice-patterned cell walls 12, providing square flow paths 13 when viewed in the longitudinal direction. Each penetrating hole 21 of the connecting member 20 preferably has an area equal to or larger than the opening area of each flow path 13 of the honeycomb structure 11, such that the penetrating hole 21 does not hinder the flow of water. Namely, the distance d' between adjacent penetrating holes 21 and 21 of the connecting member 20 is preferably equal to or less than the thickness d of the cell walls 12 of the honeycomb structure 11.

Figure 8:
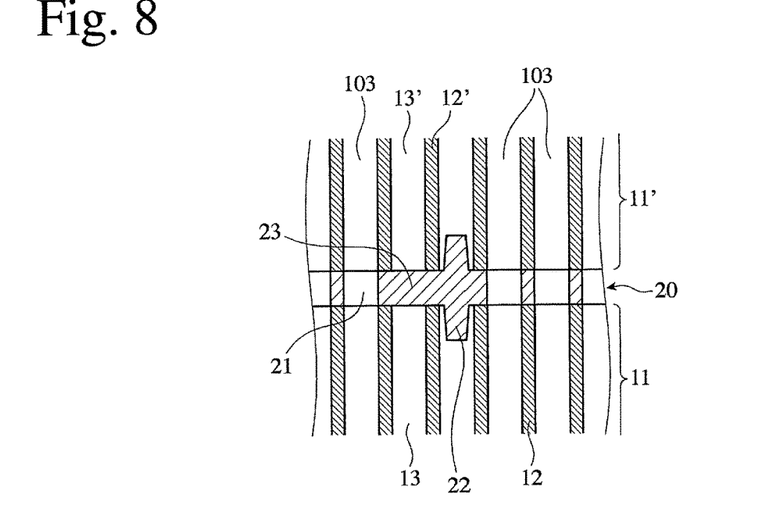
FIG. 8 is a schematic cross-sectional view showing a connecting portion of adjacent honeycomb structures in the filter unit.

FIG. 8 is a schematic cross-sectional view showing adjacent honeycomb structures 11 and 11' connected via the connecting member 20 in the filter unit. Because the honeycomb structures 11 and 11' have the same shape, communicating flow paths 103 are formed by connecting their corresponding flow paths 13, 13'. However, flow paths 13, 13' facing the belt-like region 23 are shut by the belt-like region 23, failing to constitute communicating flow paths 103.

The connecting member 20 is preferably made of elastic materials (materials having a large elastic range) easily filling small surface roughness of the honeycomb structures 11, 11', 11", for example, at least one of silicone rubber, fluororubber, ethylene-propylene-diene rubber, and nitrile-butadiene rubber, though not restrictive. It may be formed by corrosion-resistant metals such as SUS304, SUS316, SUS316L, MAT21 (registered trademarks), etc.

Water introduced through the inlet 112a of the water-treating ceramic filter module 100 (see FIGS. 1 and 2) flows through the filter unit 101 with the dissolved organic materials, etc. removed, and exits from the outlet 113a. While water passes through the filter unit 101, the organic materials, etc. dissolved in water are removed by adsorption onto surfaces of pores inside the porous ceramic cell walls 12, 12', 12".

To obtain this effect surely, part of the communicating flow paths 103 in the filter unit 101 are composed of first communicating flow paths 103b closed only at the one-side end 101a, and second communicating flow paths 103a closed only at the other-side end 101b.

Thus, water to be treated does not enter the first communicating flow paths 103b closed at the one-side end 101a, but flows into the second communicating flow paths 103a open at the one-side end 101a. Because the second communicating flow paths 103a are plugged at the other-side end 101b, the water inevitably flows through the cell walls 12, 12', 12"

to the first communicating flow paths 103b open at the other-side end 101b. To remove the dissolved organic materials, etc. from water by adsorption efficiently, the second communicating flow paths 103a are preferably adjacent to the first communicating flow paths 103b.

(b) Plugging Member

Figure 9A:
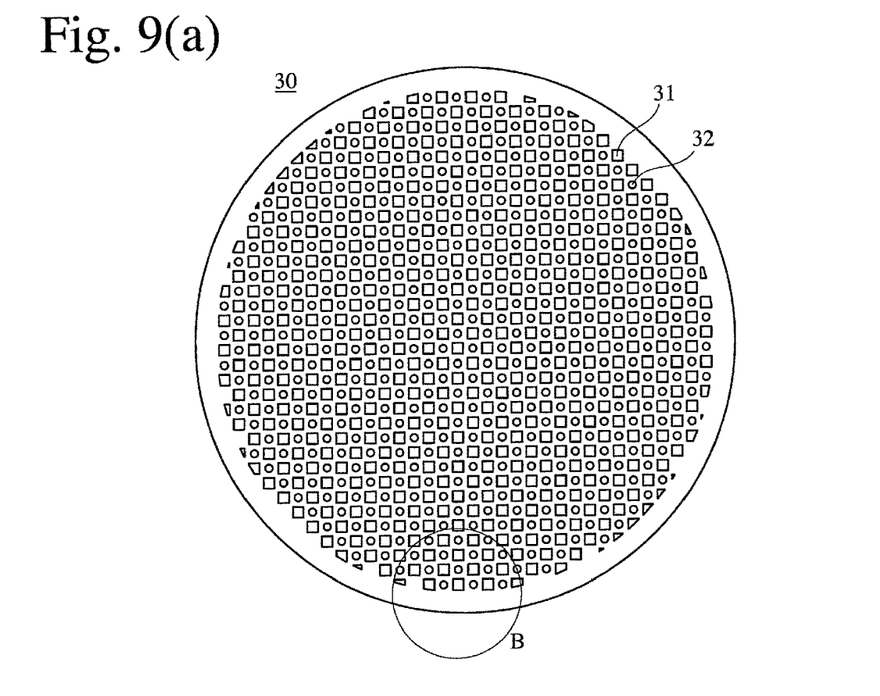
FIG. 9(a) is a front view schematically showing an example of plugging members used in the water-treating ceramic filter module of the present invention.
Figure 9B:
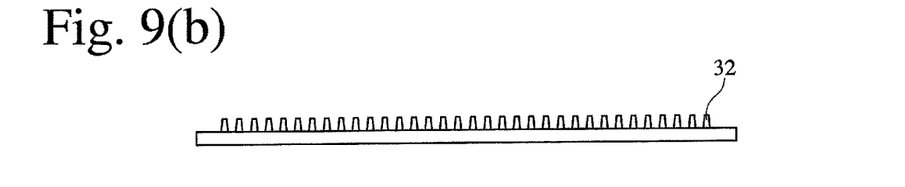
FIG. 9(b) is a plan view schematically showing the plugging member of FIG. 9(a).
Figure 10A:
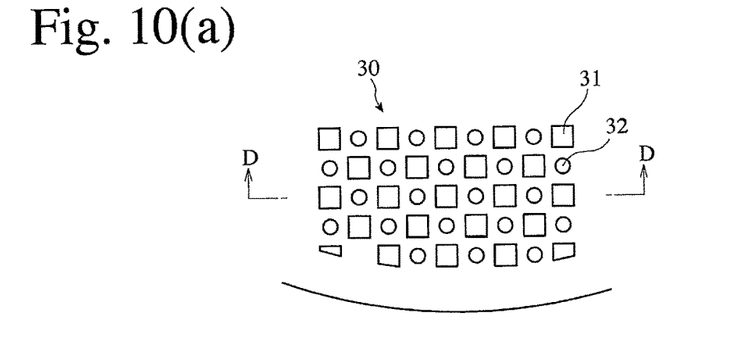
FIG. 10(a) is an enlarged front view schematically showing a portion B in FIG. 9(a).
Figure 10B:
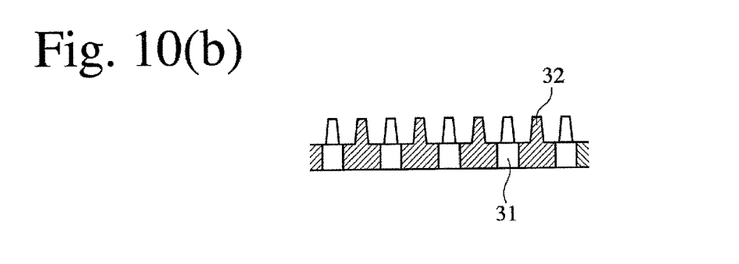
FIG. 10(b) is a cross-sectional view taken along the line D-D in FIG. 10(a).
Figure 10C:
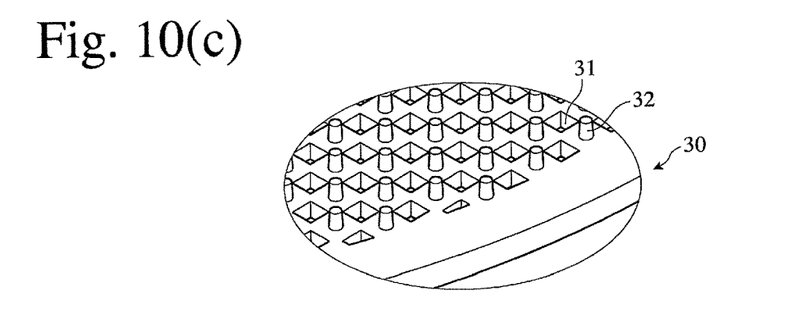
FIG. 10(c) is a perspective view of FIG. 10(a).

FIGS. 9(a) and 9(b) show an example of the plugging members 30 (first plugging member 30b and second plugging member 30a), and FIGS. 10(a), 10(b) and 10(c) enlargedly show a portion B of the plugging member 30 of FIG. 9(a). The plugging member 30 comprises penetrating holes 31 and plugs 32 aligned with the flow paths 13, 13" of the honeycomb structures 11, 11". As shown in FIG. 2, the filter unit 101 preferably comprises the first plugging member 30b having pluralities of plugs 32 for closing the first communicating flow paths 103b at the one-side end 101a, and the second plugging member 30a having pluralities of plugs 32 for closing the second communicating flow paths 103a at the other-side end 101b. The first plugging member 30b has water-flowable holes 31 at positions corresponding to the second communicating flow paths 103a, and the second plugging member 30a has water-flowable holes 31 at positions corresponding to the first communicating flow paths 103b.

The first and second plugging members 30b, 30a need only be different, such that when they are oppositely attached to the filter unit 101 at the one-side end 101a (the water to be treated is supplied) and the other-side end 101b (the treated water exits), respectively, both ends of individual communicating flow paths 103 are not closed by their plugs 32.

Namely, the plugging member 30 at the one-side end 101a, which is the first plugging member 30b, comprises the plugs 32 closing the one-side ends 101a of the first communicating flow paths 103b, and holes (inlet holes) 31 aligned with the second communicating flow paths 103a, and the plugging member 30 at the other-side end 101b, which is the second plugging member 30a, comprises the plugs 32 closing the other-side ends 101b of the second communicating flow paths 103a and holes (outlet holes) 31 aligned with the first communicating flow paths 103b. Using such plugging members 30, both ends of the filter unit 101 are easily plugged to constitute the first communicating flow paths 103b and the second communicating flow paths 103a. With this structure, honeycomb structures 11, 11" having plugged portions in advance need not be used, and all honeycomb structures 11, 11', 11" constituting the filter unit 101 can be free of plugged portions, making it unnecessary to use honeycomb structures with different shapes, thereby achieving standardization and thus suppressing production cost.

Taking for example a case where the first plugging member 30b is attached to the one-side end 101a of the filter unit 101, the structure and operation of the first plugging member 30b will be explained below. The same is true in a case where the second plugging member 30a is attached to the other-side end 101b of the filter unit 101, thereby omitting its explanation.

The holes 31 and the plugs 32 are aligned with the flow paths 13 open on the one-side end 101a of the honeycomb structure 11. In the attachment of the first plugging member 30b to the honeycomb structure 11, the plugs 32 are fit into the corresponding flow paths 13, facilitating the positioning of the holes 31 of the first plugging member 30b to the flow paths 13 of the honeycomb structure 11 to close the flow paths 13 corresponding to the plugs 32. As shown in FIG. 10(b) [D-D cross section of FIG. 10(a)], the plugs 32 are preferably tapered for easy fitting into the flow paths 13.

Figure 11:
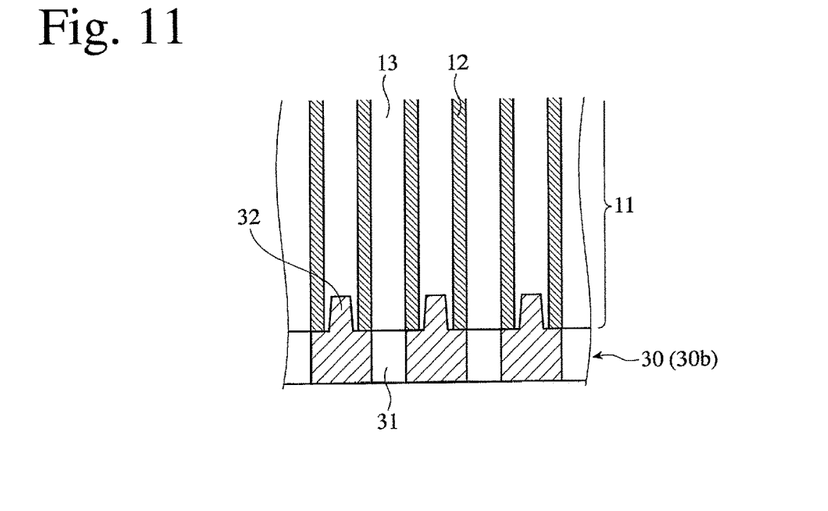
FIG. 11 is a schematic cross-sectional view showing a plugging member attached to the honeycomb structure.

FIG. 11 is a cross-sectional view showing the first plugging member 30b attached to the honeycomb structure 11. When the first plugging member 30b is attached to the honeycomb structure 11, the flow paths 13 are closed by the plugs 32, constituting the first communicating flow paths 103b. So as not to hinder the water to be treated from flowing, each hole 31 of the first plugging member 30b preferably has an area equal to or larger than the opening area of each corresponding flow path 13 of the honeycomb structure 11.

The first plugging member 30b and the second plugging member 30a may be different as long as their plugs 32 do not close both ends of individual communicating flow paths 103 as described above, and other portions of them may be the same. The plugging member 30 shown in FIGS. 9-11 is preferably a sheet having the same shape as that of the honeycomb structure 11 when viewed in the longitudinal direction. This shape further facilitates the positioning of the holes 31 of the plugging member 30 to the flow paths 13, though this shape is not necessarily restrictive. The plugging member 30 may have any thickness, and is not restricted to a sheet shape.

The plugging members 30 are preferably made of elastic materials (materials having a large elastic range) easily deformable along the surfaces of the honeycomb structures 11, 11", for example, at least one of silicone rubber, fluororubber, ethylene-propylene-diene rubber, and nitrile-butadiene rubber, though not restrictive. It may be formed by corrosion-resistant metals such as SUS304, SUS316, SUS316L, MAT21 (registered trademarks), etc.

(c) Honeycomb Structure

Figure 3A:
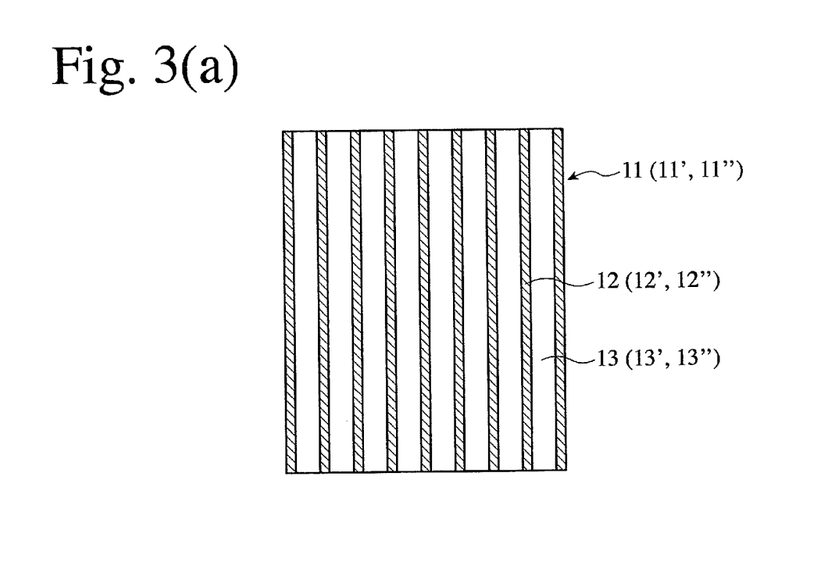
FIG. 3(a) is a center-axis-including schematic cross-sectional view showing an example of honeycomb structures used in the water-treating ceramic filter module of the present invention.
Figure 3B:
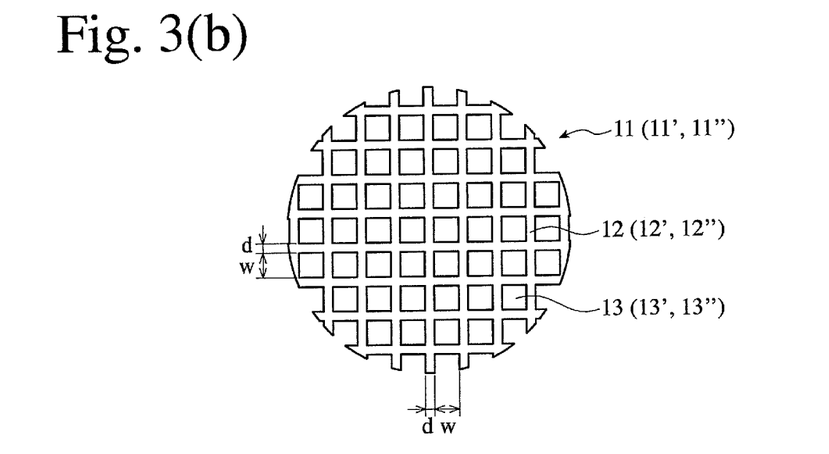
FIG. 3(b) is a schematic view showing the honeycomb structure of FIG. 3(a) when viewed in the longitudinal direction.

As shown in FIGS. 3(a) and 3(b), each honeycomb structure 11 (11', 11") constituting the filter unit 101 has a cylindrical shape having pluralities of flow paths 13 (13', 13") partitioned by porous ceramic cell walls 12 (12', 12"). Namely, the honeycomb structure 11 (11', 11") has a honeycomb shape having pluralities of longitudinally extending flow paths 13 (13', 13"). Porous ceramic materials include cordierite, alumina, silica, magnesia, titania, etc. Though not restrictive as long as porous honeycomb structures can be formed, easily moldable cordierite or alumina having a small thermal expansion coefficient is preferable. The honeycomb structure 11 (11', 11") may comprise an outer peripheral (side) wall obtained by sintering a coating material containing cordierite particles and colloidal silica, etc.

In the honeycomb structure 11 (11', 11"), organic materials, etc. dissolved in the water to be treated are adsorbed onto large numbers of pores in the cell walls 12 (12', 12") communicating between adjacent flow paths, thereby conducting water purification. The pores formed in the cell walls 12 (12', 12") have a median pore diameter of preferably 1-50 μm, more preferably 5-30 μm, and further preferably 10-20 μm. The median pore diameter is a pore diameter at a pore volume corresponding to 50% of the total pore volume, in a curve exhibiting the relation between pore diameter and cumulative pore volume in the cell walls.

The cell walls 12 (12', 12") preferably have porosity of 25-70%. When the porosity of the cell walls 12 (12', 12") is 25% or more, an adsorbing material described below can easily be carried by the cell walls without closing the communicating pores. When the porosity of the cell walls 12 (12', 12") is 70% or less, the cell walls 12 (12', 12") have such mechanical strength that they are not broken by water pressure or shock in assembling into the housing.

Though not restrictive, the cell walls 12 (12', 12") of the honeycomb structure 11 are preferably in a lattice pattern when viewed in the longitudinal direction. FIG. 3 shows a honeycomb structure 11 having lattice-shaped cell walls 12 forming square flow paths 13 when viewed in the longitudinal direction. In FIG. 3, the cell walls 12 (12', 12") preferably have thickness d of 0.1-2 mm, and a ratio d/w of the thickness d to the width w of flow paths 13 (13', 13") formed by the cell walls 12 (12', 12") preferably meets the relation of 0.25≤d/w≤1.25. When the thickness of the cell walls 12 (12', 12") is 0.1 mm or more, and/or when 0.25≤d/w is met, the cell walls 12 (12', 12") have such mechanical strength that they are not broken by water pressure or shock in assembling into the housing. Also, because of sufficiently long communicating pores, metal oxide particles, etc. exhibiting sufficient adsorption performance can be carried. When the thickness of the cell walls 12 (12', 12") is 2 mm or less, and/or when d/w≤1.25 is met, pressure necessary for permeating water can be low, enabling the water treatment with high energy efficiency.

The honeycomb structure 11 shown in FIGS. 3(a), 3(b) and 7 has square flow paths 13 (13', 13") when viewed in the longitudinal direction. Each flow path 13 (13', 13") is preferably in a square shape having a width (length of one side) w of 0.5-8 mm when viewed in the longitudinal direction. When the width (length of one side) w of the flow paths 13 (13', 13") is 0.5 mm or more, foreign matter other than the dissolved organic materials, etc. unlikely clogs the openings of the second communicating flow paths 103a of the filter unit 101, slowing down performance decrease. On the other hand, when the width (length of one side) of the flow paths 13 (13', 13") is 8 mm or less, the cell walls 12 (12', 12") of the filter unit 101 have such large thickness d as to have enough mechanical strength to avoid breakage by shock in module assembling or water pressure, even under the reduced water-flowing resistance. The cross section of each flow path 13 (13', 13") when viewed in the longitudinal direction is not restricted to be square as shown in FIG. 3(b), but may be in any other shapes such as tetragon (rectangle, etc.), triangle, hexagon, etc., or their combinations.

The cell walls 12 (12', 12") may carry an adsorbing material for improving adsorption performance. The adsorbing materials include the above ceramics (metal oxides), as well as resins such as nylons, aramides, polyamides, celluloses, polyethylene, etc., and these materials are selected for objects to be removed because of adsorption selectivity. The metal oxide particles include particles of α-alumina, γ-alumina, zinc oxide, copper oxide, etc. The thickness of the adsorbing material carried is on such a level as not undesirably lowering the water pressure, preferably an average thickness of 1/10 or less of the median pore diameter of cell walls. The average thickness is determined by dividing a volume calculated from the amount (weight) and specific gravity of the adsorbing material carried, by the specific surface area of the honeycomb structure measured by a mercury porosimeter, etc.

(2) Housing

As shown in FIG. 1, the housing 110 constituting the water-treating ceramic filter module 100 of the present invention comprises a filter container 111 receiving the filter unit 101, a funnel-shaped inlet part 112 arranged on the supply side of the water to be treated, and a funnel-shaped exit part 113 arranged on the side of discharging the treated water. The water to be treated which is supplied through the inlet 112a of the inlet part 112 evenly expands toward the one-side end 101a of the filter unit 101 due to the funnel shape of the inlet part 112, flows into the second communicating flow paths 103a, and passes through the communicating pores (not shown) of the cell walls 12, 12', 12" to enter the first communicating flow paths 103b. While the water to be treated passes through the communicating pores of the cell walls 12, 12', 12", the dissolved organic materials, etc. are removed to provide the treated water. The treated water passing through the first communicating flow paths 103b and exiting from the other-side end 101b is converged by the funnel shape of the exit part 113, and then discharged from the outlet 113a.

The flanges 111b of the filter container 111 are fixed to the flanges 112b, 113b of the inlet and exit parts 112, 113 by bolts, etc. (not shown), to constitute an integral housing 110. The filter container 111 is preferably in a cylinder shape having substantially the same length as that of the filter unit 101, and necessary and sufficient inner shape and size (viewed in the longitudinal direction) for containing the filter unit 101.

The housing 110 is preferably made of materials resistant to seawater and aqueous alkaline solutions, such as metals such as SUS304, SUS316, etc., resins such as hard polyvinyl chloride (PVC), polyethylene (PE), etc. The filter container 111, the inlet part 112 and the exit part 113 may be made of the same or different materials.

The inlet and exit parts 112, 113 and the filter container 111 are fixed to press the filter unit 101 in the flow path direction, thereby tightly attaching the connecting members and the plugging members to the honeycomb structure to secure water tightness inside the housing 110. In FIG. 1, ring members 115 are preferably disposed between the flanges 111b and 112b, and 111b and 113b, to provide higher water tightness.

In the water-treating filter module 100 shown in FIG. 1, the flange 112b of the inlet part 112 and the flange 113b of the exit part 113 extend from positions slightly inside the filter container 111, overlapping peripheral portions of the one-side and other-side ends 101a, 101b of the filter unit 101, with sealing members 114 disposed between these peripheral portions and the flanges 112b, 113b. The sealing members 114 more preferably increase water tightness, and surely fix the filter unit 101 inside the housing 110.

Figure 12:
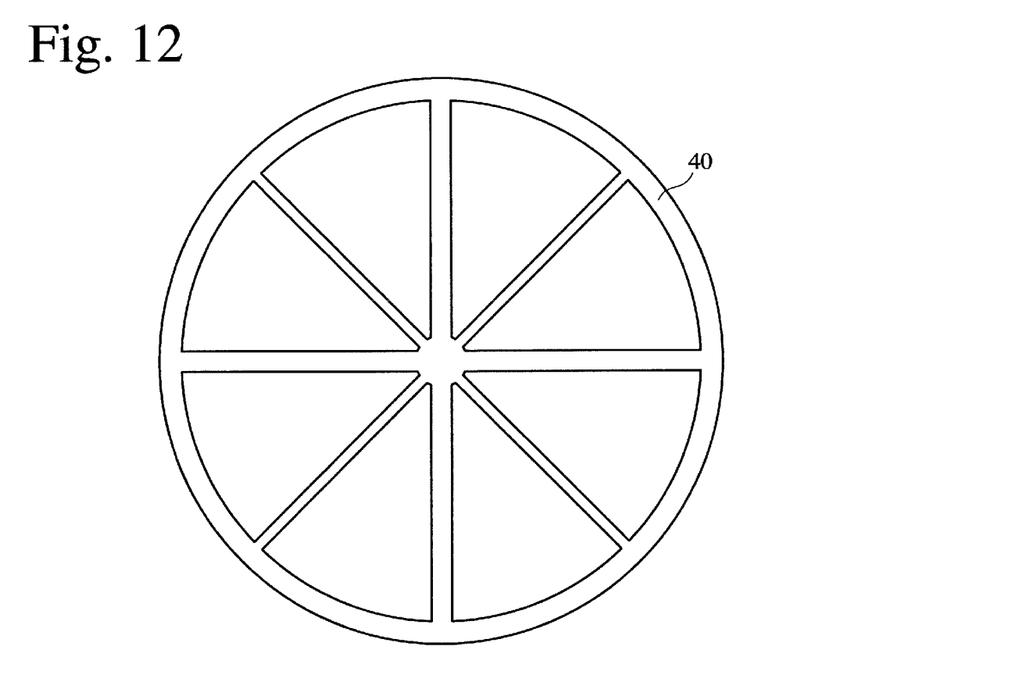
FIG. 12 is a schematic view showing an example of fixing members used in the water-treating ceramic filter module of the present invention.

Though not shown in FIG. 1, to fix the plugging members 30 more surely, the water-treating filter module 100 may further comprise fixing members 40 shown in FIG. 12. The fixing member 40 is attached to an outer surface of each plugging member 30 mounted to the filter unit 101, to push the plugging member 30. The fixing members 40 prevent the plugging members 30 from detaching by water pressure, and increase the attachment tightness of the plugging members 30 to the honeycomb structures 11, 11", thereby preventing water leak from the communicating flow paths 103 plugged by the plugging members 30, particularly from the second communicating flow paths 103a, into which the water to be treated is introduced, to the other-side end 101b. Though the fixing member 40 shown in FIG. 12 has a wheel shape, it may have any shape such as a mesh, a punched plate, etc., as long as water can flow with small resistance while fixing the plugging members 30. The fixing members 40 may be made of any material, as long as they prevent the plugging members 30 from detaching by water pressure, are strong enough to avoid easy deformation and substantially insoluble in water. For example, resins such as polyethylene, polypropylene, polyethylene terephthalate, polystyrene, etc., and metals such as stainless steel, titanium alloys, etc. can be used.

EXAMPLE

The present invention will be explained in further detail by Examples, without intention of restricting the scope of the present invention.

Example 1

Powders of kaolin, talc, silica, aluminum hydroxide and alumina were mixed to obtain a cordierite-forming powder having a chemical composition comprising 50% by mass of $SiO_2$, 36% by mass of $Al_2O_3$, and 14% by mass of MgO. This cordierite-forming powder was mixed with methyl cellulose and hydroxypropyl methyl cellulose as molding aids, and thermally expandable microcapsule as a pore-forming material, and sufficiently blended with a proper amount of ion-exchanged water to prepare a material extrusion-moldable to a honeycomb structure.

The moldable material was extruded to form a honeycomb-structure green body, which was dried, machined to remove its peripheral portion, and sintered at 1400° C. for 24 hours to obtain a sintered cylindrical honeycomb structure. An outer peripheral surface of the sintered honeycomb structure was coated with a coating material containing cordierite particles and colloidal silica, dried and then sintered, to obtain a cylindrical porous ceramic honeycomb structure of 127 mm in outer diameter and 152.4 mm in length, which had square flow paths of 0.76 mm in cell wall thickness and 2.75 mm in cell pitch when viewed in the longitudinal direction.

Three honeycomb structures 11, 11', 11", two connecting members 20, each of which was a silicone rubber sheet of 127 mm in diameter and 2.0 mm in thickness having a region in which penetrating holes 21 of 2.0 mm in each side were provided at a pitch of 2.75 mm, and a belt-like region 23 in which projections 22 of 1.4 mm in diameter and 2.0 mm in height were arranged in a staggering pattern [see FIGS. 4(a) and 4(b)], and first and second plugging members 30b, 30a, each of which was a silicone rubber sheet of 127 mm in diameter and 3.0 mm in thickness, and had holes 31 of 2.0 mm in each side and plugs 32 of 2.0 mm in height alternately arranged at a pitch of 2.75 mm in a staggering pattern [see FIGS. 9(a) and 9(b)] were prepared. As shown in FIG. 2, the honeycomb structures 11, 11', 11" were connected in series via the connecting members 20, and the first plugging member 30b was attached to the one-side end 101a of the honeycomb structure 11, and the second plugging member 30a was attached to the other-side end 101b of the honeycomb structure 11", to produce a filter unit 101 comprising first communicating flow paths 103b penetrating to the other-side end 101b and plugged only at the one-side end 101a, and second communicating flow paths 103a penetrating to the one-side end 101a and plugged only at the other-side end 101b.

Together with the filter unit 101, a filter container 111 of SUS304 having an outer diameter of 137 mm and a length of 467.2 mm, funnel-shaped inlet and exit parts 112, 113 of SUS304 each having an outer diameter of 137 mm, ring-shaped sealing members 114 of a nitrile-butadiene rubber each having a thickness of 4.0 mm, and fixing members 40 were assembled in the housing 110 as described below, to produce the water-treating ceramic filter module 100 of the present invention shown in FIG. 1.

With the sealing members 114, the fixing members 40 and the filter unit 101 successively placed on the flange 112b of the inlet part 112, the filter container 111 was arranged to cover the side surface of the filter unit 101, and the flange 111b of the filter unit 101 and the flange 112b of the inlet part 112 were fixed by bolts and nuts. Similarly, the fixing members 40 and the sealing members 114 were successively placed on the filter unit 101, and the flange 111b of the filter unit 101 and the flange 113b of the exit part 113 were fixed by bolts and nuts to obtain a water-treating ceramic filter module 100.

To evaluate contaminant-capturing performance by the water-treating ceramic filter module, a filtration test was conducted on artificial contaminated water obtained by adding 0.1% by mass of SiC particles having particle sizes of #1000 (average particle diameter: about 15 μm) as an artificial contaminant to tapped water.

The artificial contaminated water was circulated through the water-treating ceramic filter module 100 of Example 1, by a method of introducing it into the inlet 112a, discharging it from the outlet 113a, and introducing it into the inlet 112a again. Circulation was stopped when the turbidity of the circulated artificial contaminated water reached the same level as that of the tapped water, and the filter unit 101 was taken out and disassembled to measure the amount and distribution of SiC particles captured in each honeycomb structure 11, 11', 11".

It was observed that in the water-treating ceramic filter module 100 of Example 1, SiC particles were substantially uniformly captured in all of three honeycomb structures 11, 11', 11", namely, substantially uniformly from one-side end to the other-side end of the filter unit. This indicates that the honeycomb structures 11, 11', 11" in the water-treating ceramic filter module 100 of Example 1 exhibited uniform capturing and filtering performance, meaning that the filter unit 101 integrally constituted by them acted substantially as one large honeycomb structure.

Comparative Example 1

A plugging slurry of a cordierite-forming material was charged into flow path end portions of a sintered honeycomb structure produced in the same manner as in Example 1, such that inlet and exit end portions of the flow paths were alternately plugged. Thereafter, the plugging material slurry was dried and sintered. After forming the plugs, an outer peripheral surface of the ceramic honeycomb structure was coated with a coating material containing cordierite particles and colloidal silica, dried, and sintered to obtain a cylindrical porous ceramic honeycomb filter of 127 mm in outer diameter and 152.4 mm in length, which had square flow paths of 0.76 mm in cell wall thickness and 2.75 mm in cell pitch when viewed in the longitudinal direction.

Figure 14:
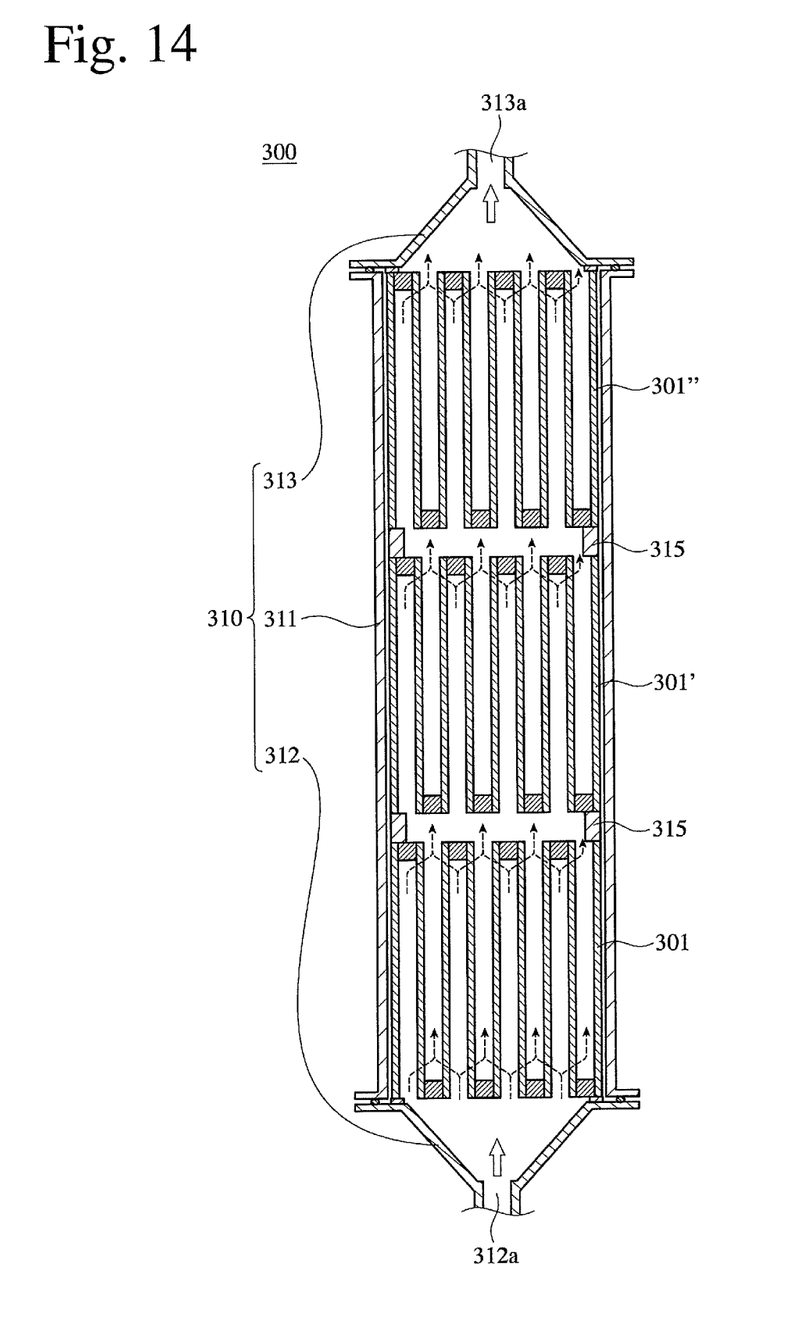
FIG. 14 is a schematic cross-sectional view showing the water-treating ceramic filter module of Comparative Example 1.

As shown in FIG. 14, three porous ceramic honeycomb filters 301, 301', 301" thus obtained were arranged in series via spacers 315, and covered with the housing 310 to produce the water-treating ceramic filter module 300 of Comparative Example 1 shown in FIG. 14.

The water-treating ceramic filter module 300 of Comparative Example 1 differs from the water-treating ceramic filter module 100 of Example 1, in that each of three porous ceramic honeycomb filters 301, 301', 301" is alternately plugged in inlet and exit end portions of the flow paths, and that all porous ceramic honeycomb filters 301, 301', 301" are separated from each other. Accordingly, The water-treating ceramic filter module 300 of Comparative Example 1 does not have communicating flow paths 103 penetrating all of the three filters, unlike the filter unit 101 of Example 1.

Using the water-treating ceramic filter module 300 of Comparative Example 1, a filtration test was conducted by circulating artificial contaminated water prepared in the same manner as in Example 1.

In the water-treating ceramic filter module 300 of Comparative Example 1, it was observed that 94% of SiC particles in the artificial contaminated water containing 0.1% by mass of SiC particles in tapped water was trapped in the porous ceramic honeycomb filter 301 on the inlet side, indicating extremely higher accumulation than in the other porous ceramic honeycomb filters 301', 301".

It was thus verified that when flow paths in three porous ceramic honeycomb filters arranged in series were not communicating with each other without space, the overall capturing performance was substantially on the same level as that of one porous ceramic honeycomb filter.

In general, when clogging occurs by an increased amount of the captured contaminant, it can be eliminated by backwashing by which treating water is caused to flow through the filter in a reverse direction to discharge the contaminant from the filter, thereby recovering the performance. A smaller amount of the contaminant captured per a unit area of the cell walls makes the removal of the contaminant easier, enabling the faster recovery of performance.

With the same amount of SiC particles captured, comparison was conducted. As a result, it was found that SiC particles were more easily removed by backwashing in the water-treating ceramic filter module 100 of Example 1 in which SiC particles were uniformly distributed in the filter unit 101, than in the water-treating ceramic filter module 300 of Comparative Example 1 in which SiC particles were predominantly captured in the porous ceramic honeycomb filter 301, so that the performance of the water-treating ceramic filter module 100 of Example 1 was sufficiently recovered by backwashing for a predetermined period of time, making it possible to reduce the frequency of backwashing for maintaining the performance. On the other hand, in the water-treating ceramic filter module 300 of Comparative Example 1 in which SiC particles were predominantly captured in the porous ceramic honeycomb filter 301, the performance was not sufficiently recovered by backwashing in the same time period as in Example 1, indicating that to maintain the performance, backwashing should be conducted more frequently for a longer period of time.

When the performance is not fully recovered by repeated backwashing, the replacement of porous ceramic honeycomb filters 301, 301', 301" is needed. Long continuous use could not be achieved by the water-treating ceramic filter module 300 of Comparative Example 1, because the porous ceramic honeycomb filter 301 on the supply side of water to be treated should be frequently replaced.

On the other hand, the water-treating ceramic filter module 100 of Example 1 needed only less frequent backwashing, and easily recovered performance by one backwashing operation, thereby reducing the number of replacement operations of the filter unit 101. Accordingly, it enjoyed higher efficiency, maintaining the performance for a long period of time.

DESCRIPTION OF REFERENCE NUMERALS

100: Water-treating ceramic filter module
101: Filter unit
101a: One-side end
101b: The other-side end
103: Communicating flow path
103a: Second communicating flow path
103b: First communicating flow path
11, 11', 11": Honeycomb structure
12, 12', 12": Cell wall
13, 13', 13": Flow path
20: Connecting member
21: Penetrating hole
22: Projection
23: Belt-like region
24: Peripheral portion
30: Plugging member
30a: Second plugging member
30b: First plugging member
31: Hole
32: Plug
40: Fixing member
110: Housing
111: Filter container
112: Inlet part
113: Exit part
112a: Inlet
113a: Outlet
111b, 112b, 113b: Flange
114: Sealing member
115: Ring member
200: Water treatment facility
201: Water tank
202: Water-supplying pump
203: Reverse osmosis membrane module
204: Reverse osmosis membrane
300: Water-treating ceramic filter module
301, 301', 301": Porous ceramic honeycomb filter
310: Housing
311: Filter container
312: Inlet part
313: Exit part
312a: Inlet
313a: Outlet
314: Sealing member
315: Ring member

What is claimed is:

1. A water-treating ceramic filter module comprising a filter unit, and a housing containing said filter unit;

said filter unit comprising pluralities of cylindrical honeycomb structures each having pluralities of flow paths partitioned by porous ceramic cell walls and extending in one direction, and sheet-shaped connecting members connecting said honeycomb structures in series in the flow path direction;

each of said connecting members having a top surface and a bottom surface and having pluralities of penetrating holes for achieving the communication of the corresponding flow paths of adjacent honeycomb structures, to constitute pluralities of communicating flow paths;

said communicating flow paths being composed of first communicating flow paths plugged only at one-side end, and second communicating flow paths plugged only at the other-side end; and said housing having an inlet on the side of said one-side end for receiving water to be treated from outside, and an outlet on the side of said other-side end for discharging the treated water, wherein said filter unit comprises a first plugging member having pluralities of plugs closing only said first communicating flow paths at said one-side end, and a second plugging member having pluralities of plugs closing only said second communicating flow paths at said other-side end, and wherein said first plugging member has holes for permitting the water to be treated to flow at positions corresponding to said second communicating flow paths, and said second plugging member has holes for permitting the treated water to flow at positions corresponding to said first communicating flow paths.

2. The water-treating ceramic filter module according to claim 1, wherein said first communicating flow paths and said second communicating flow paths are adjacent to each other.

3. The water-treating ceramic filter module according to claim 1, wherein each of said connecting members has projections on both the top and bottom surfaces, said projections being fit into particular flow paths open on end surfaces of the adjacent honeycomb structures to connect said adjacent honeycomb structures.

4. The water-treating ceramic filter module according to claim 1, wherein said projections of said connecting members are tapered.

5. The water-treating ceramic filter module according to claim 1, wherein each of said connecting members has a belt-like region having said projections but free of said penetrating holes on both the top and bottom surfaces.

6. The water-treating ceramic filter module according to claim 1, wherein a distance between adjacent penetrating holes of each of said connecting members is equal to or less than the thickness of said cell walls of said honeycomb structure.

7. The water-treating ceramic filter module according to claim 1, wherein each of said connecting members has the same shape as that of said honeycomb structure when viewed in the longitudinal direction.

8. The water-treating ceramic filter module according to claim 1, wherein said connecting members are made of an elastic material.

9. The water-treating ceramic filter module according to claim 1, wherein said elastic material forming said connecting members is at least one selected from the group consisting of silicone rubber, fluororubber, ethylene-propylene-diene rubber, and nitrile-butadiene rubber.

10. The water-treating ceramic filter module according to claim 1, wherein said first and second plugging members are sheets having the same shape as that of said honeycomb structure when viewed in the longitudinal direction.

11. The water-treating ceramic filter module according to claim 1, wherein each of said holes of the first and second plugging members has an area equal to or larger than an opening area of each corresponding flow path of said honeycomb structure.

12. The water-treating ceramic filter module according to claim 1, wherein said first and second plugging members are made of an elastic material.

13. The water-treating ceramic filter module according to claim 12, wherein said elastic material forming said first and second plugging members is at least one selected from the group consisting of silicone rubber, fluororubber, ethylene-propylene-diene rubber, and nitrile-butadiene rubber.

14. The water-treating ceramic filter module according to claim 1, wherein said housing is made of a material resistant to aqueous alkaline solutions.

\* \* \* \* \*